US009810570B2

(12) United States Patent
Iryo et al.

(10) Patent No.: US 9,810,570 B2
(45) Date of Patent: Nov. 7, 2017

(54) LIQUID SURFACE DETECTION DEVICE

(71) Applicant: NIPPON SEIKI CO., LTD., Niigata (JP)

(72) Inventors: Hiroyuki Iryo, Niigata (JP); Yoshiyuki Shimazaki, Niigata (JP); Yukio Ogasawara, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 136 days.

(21) Appl. No.: 14/398,687

(22) PCT Filed: Apr. 5, 2013

(86) PCT No.: PCT/JP2013/060439
§ 371 (c)(1),
(2) Date: Nov. 3, 2014

(87) PCT Pub. No.: WO2013/172113
PCT Pub. Date: Nov. 21, 2013

(65) Prior Publication Data
US 2015/0107355 A1   Apr. 23, 2015

(30) Foreign Application Priority Data

May 18, 2012  (JP) .................................. 2012-114311

(51) Int. Cl.
*G01F 23/72* (2006.01)
*G01F 23/38* (2006.01)

(52) U.S. Cl.
CPC .............. *G01F 23/72* (2013.01); *G01F 23/38* (2013.01)

(58) Field of Classification Search
CPC ........... G01F 23/30; G01F 23/38; G01F 23/72
(Continued)

(56) References Cited

U.S. PATENT DOCUMENTS

2004/0231415 A1* 11/2004 Okada ..................... G01F 23/38
73/290 R
2006/0016256 A1* 1/2006 Bauerle ................... G01F 23/36
73/313
(Continued)

FOREIGN PATENT DOCUMENTS

| JP | 11-083538 A | 3/1999 |
| JP | 2002-206945 A | 7/2002 |

(Continued)

OTHER PUBLICATIONS

JP 2009128195 A Translation of Description Tanaka, Tomoyuki Jun. 2009.*

(Continued)

*Primary Examiner* — Natalie Huls
*Assistant Examiner* — Monica S Young
(74) *Attorney, Agent, or Firm* — McDermott Will & Emery LLP

(57) ABSTRACT

Provided is a liquid surface detection device providing for compactness and enabling a reduction in displacement of a rotating shaft of a magnet. In the liquid surface detection device, which is provided with a holder rotating in response to displacement of a float, said displacement accompanying a change in a liquid surface, which is provided with a magnet affixed to the holder and rotating along with the holder, and which is provided with a magnetic detection element detecting a magnetic force change accompanying the rotating motion of the magnet, said liquid surface detection device is provided with: a body section that provides on the holder, first and second rotating sections sandwiching the magnet therebetween in the rotary axis direction of the magnet, said body section being provided with a first rotary support section that places the magnetic detection element opposite the magnet in the rotary axis direction of the magnet, and that rotatably supports the first rotation section of the holder;

(Continued)

and a cover that is affixed to the body section, and is provided with a second rotary support section that rotatably supports the second rotating section of the holder.

7 Claims, 2 Drawing Sheets

(58) Field of Classification Search
 USPC .......................................................... 73/313
 See application file for complete search history.

(56) References Cited

U.S. PATENT DOCUMENTS

| 2012/0266670 | A1* | 10/2012 | Ichisawa | G01F 23/38 |
| | | | | 73/314 |
| 2015/0107355 | A1* | 4/2015 | Iryo | G01F 23/72 |
| | | | | 73/313 |
| 2015/0300870 | A1* | 10/2015 | Fukuhara | G01F 23/72 |
| | | | | 73/309 |

FOREIGN PATENT DOCUMENTS

| JP | 2003-172653 | A | | 6/2003 |
| JP | 2004-347519 | A | | 12/2004 |
| JP | 2009-128195 | A | | 6/2009 |
| JP | 2009128195 | A | * | 6/2009 |
| JP | 2010181244 | A | * | 8/2010 |
| JP | 2011-141146 | A | | 7/2011 |

OTHER PUBLICATIONS

JP 2010181244 A Translation of Description Miyagawa, Isao Aug. 2010.*

Extended European Search Report issued in Application No. 13791269.7 dated Jan. 5, 2016.

International Search Report issued in International Application No. PCT/JP2013/060439 dated May 14, 2013, with English translation.

* cited by examiner

LIQUID SURFACE DETECTION DEVICE

RELATED APPLICATIONS

This application is the U.S. National Phase under 35 U.S.C. §371 of International Application No. PCT/JP2013/060439, filed on Apr. 5, 2013, which in turn claims the benefit of Japanese Application No. 2012-114311, filed on May 18, 2012, the disclosures of which are incorporated by reference herein.

TECHNICAL FIELD

The present invention relates to a liquid surface detection device that detects a surface of liquid such as fuel in a fuel tank.

BACKGROUND ART

A conventional liquid surface detection device is, for example, disclosed in PTL 1. In this liquid surface detection device, as a magnet rotates with a shaft along with vertical motions of a float that follows fluctuations of the liquid surface, output voltage of a magnetic resistance element, more specifically a magnetic detection element, which is attached to a body opposite the magnet, changes. A position of the float, in other words, a liquid surface of the fuel, is detected by the output voltage of the magnetic resistance element. The liquid surface detection device can be made smaller by reducing a projected area viewed from the rotary axis direction of the magnet by placing the magnetic detection element on the rotary axis of the magnet or in the rotary axis direction of the magnet.

CITATION LIST

Patent Literature

[PTL 1] JP-A-2003-172653

SUMMARY OF INVENTION

Technical Problem

However, in the liquid surface detection device, an approximate bottom-formed holding hole that rotatably holds the shaft is formed on the body, and the shaft rotatably fits into the holding hole. As the portion that rotatably holds the shaft is a single bearing structure including the shaft and the holding hole, the rotary axis of the shaft is displaced by the impact of irregular fluctuations of the liquid surface. Moreover, the rotary axis of the magnet fixed to the shaft is also displaced. Therefore, the output voltage of the magnetic detection element is more likely to be affected by said displacement.

Therefore, the invention is made in view of the problems described above and an object of the invention is to provide a liquid surface detection device providing for compactness and enabling a reduction in displacement of the rotary axis of the magnet.

Solution to Problem

A liquid surface detection device according to the invention including: a holder rotating in response to displacement of a float, the displacement accompanying a change in a liquid surface; a magnet affixed to the holder and rotating along with the holder; and a magnetic detection element detecting a magnetic force change accompanying the rotating motion of the magnet, in which a body section that provides on the holder a first rotating section and a second rotating section sandwiching the magnet therebetween in the rotary axis direction of the magnet, the body section being provided with a first rotary support section that places the magnetic detection element opposite the magnet in the rotary axis direction of the magnet and that rotatably supports the first rotation section of the holder, and a cover that is fixed to the body section and is provided with a second rotary support section that rotatably supports the second rotating section of the holder are provided.

Furthermore, the first rotary support section has a sliding surface of which cross-section is formed in a circular shape and vertical to the rotary axis direction of the magnet, and the first rotating section includes a slide receiving surface that rotatably holds an outer circumference of the sliding surface.

Further, the second rotating section has a sliding surface of which cross-section is formed in a circular shape and vertical to the rotary axis direction of the magnet, and the second rotary support section includes a slide receiving surface that rotatably holds an outer circumference of the sliding surface.

Advantageous Effects of Invention

With the above-mentioned configuration, the invention can attain the object of providing a liquid surface detection device providing for compactness and enabling a reduction in displacement of the rotary axis of a magnet.

DESCRIPTION OF EMBODIMENTS

Figure 1:
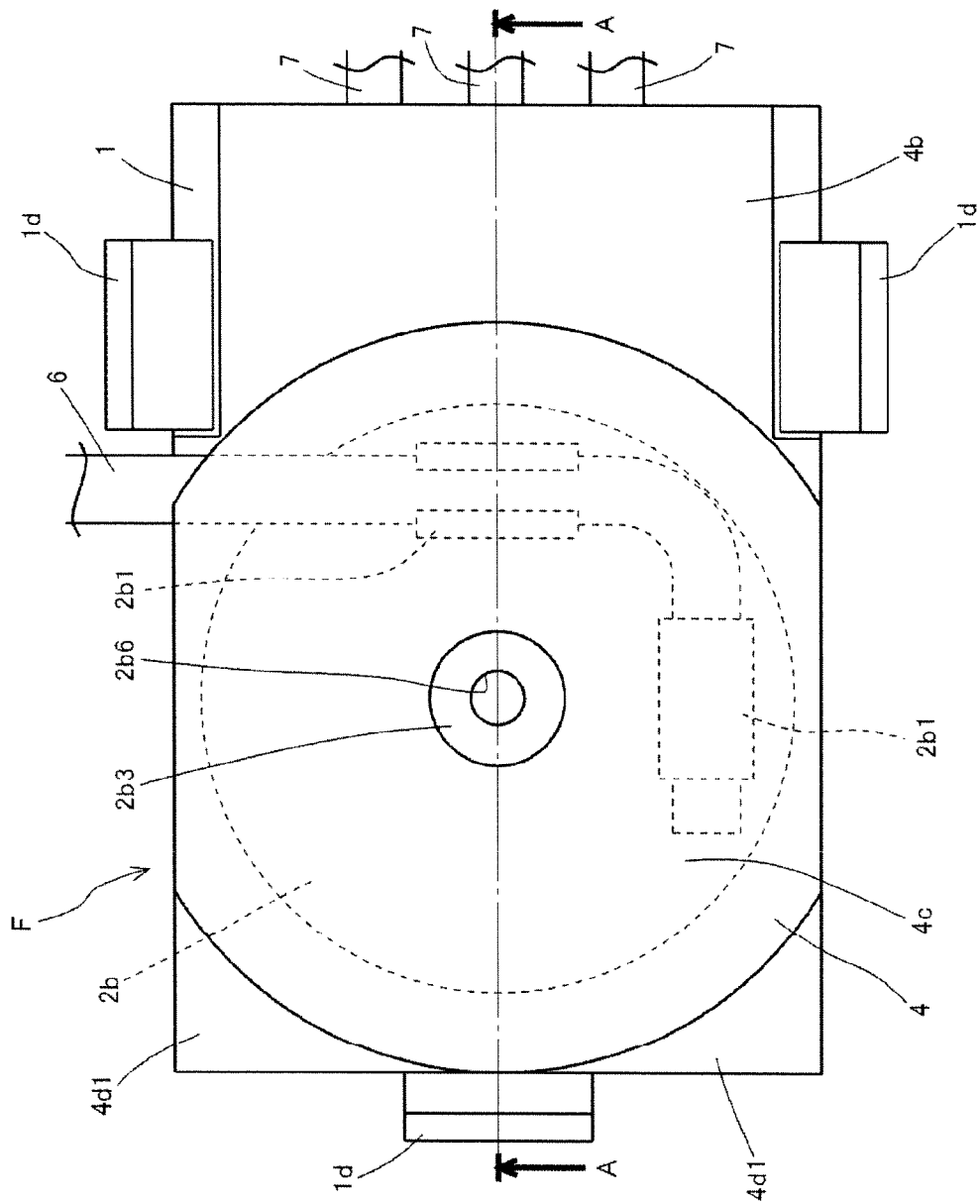
FIG. 1 is a top view of a liquid surface detection device of one embodiment of the invention.

Hereinafter, one embodiment of the invention will be described with reference to the accompanying drawings.

A liquid surface detection device F of the invention is installed in a fuel tank, not illustrated, which stores liquid fuel such as gasoline.

The liquid surface detection device F mainly includes a body section 1, a holder 2, a magnet 2a, magnetic detection element 3, and a cover 4.

The body section 1 has first resin bodies 11 and a second resin body 12.

The first resin bodies 11 are made of resin material such as polyacetal (hereinafter, "POM"), and has a plurality of terminals 1a that are built therein by primary molding. On a part that is exposed from the first resin bodies 11 of the terminals 1a, a magnetic detection element 3 and an electronic part (condenser or register for noise absorption) 5 are mounted.

After mounting the magnetic detection element 3 and the electronic part 5 on the terminals 1a, the first resin bodies 1 are insert-molded by the second resin body 12 that is made of the same resin material as the first resin bodies 11, so as to form the body section 1. Along with the terminals 1a, the magnetic detection element 3, and the electronic part 5, the first resin bodies 11 are sealed by the second resin body 12 in an air tight manner.

The body section 1 includes a first rotary support section 1b that rotatably supports the holder 2. The first rotary support section 1b is integrally formed with the second resin body 12. The first rotary support section 1b has a cylindrical shape and protrudes to the side of the holder 2 that includes the magnet 2a. The first rotary support section 1b having a cylindrical shape has a sliding surface of which cross-section is formed in a circular shape and vertical to the rotary axis direction of the magnet 2a. On the rotary axis of the first rotary support section 1b in the body section 1, a magnetic detection surface 3a of the magnetic detection element 3 is provided opposite the magnet 2a.

Moreover, on the back side of the body section 1 (opposite the side on which the holder 2 is provided), positioning bosses 1c are provided for determining positions to be attached to a fuel pump, an attachment stay, and the like. On the sides of the body section 1, hooks 1d are provided to be attached to the fuel pump, the attachment stay, and the like. The positioning bosses 1c and the hooks 1d are integrally formed with the second resin body 12.

In order to produce the body section 1, a plurality of mutually connected terminals 1a are insert-molded with the first resin bodies 11 by primary molding. After the insert molding, the terminals 1a are cut by press, and the magnetic detection element 3 and the electronic part 5 are welded to the cut terminals 1a by resistance welding or soldered thereto. Furthermore, the first resin bodies 11 are secondarily formed by the second resin body 12. The body section 1 is produced by this production method.

The holder 2 is made of resin material such as POM, and the magnet 2a is fixed by insert molding.

The magnet 2a is made of, for example, neodymium-ferrite material, having a cylindrical shape with the rotary axis of the magnet 2a as the center. In this embodiment, two poles are magnetized.

The holder 2 includes a flange section 2b, an arm attachment section 2b1, a first rotating section 2b2, and a second rotating section 2b3.

The flange section 2b has a disk shape, and is so formed that spreads radially outwards with the rotary axis of the holder 2 as the center in a direction vertical to the rotary axis direction of the holder 2.

On the upper side of the flange section 2b (upper side in FIG. 2), an arm attachment section 2b1 is provided. The arm attachment section 2b1 is for attachment of a float arm 6 that transmits to the holder 2 motions of a float, not illustrated, which floats accompanying a change in a liquid surface.

On the lower side of the flange section 2b, a retaining section 2b4 that retains the magnet 2a and a first rotating section 2b2 are provided.

The retaining section 2b4 has a hollow cylindrical shape, with its lower side being narrower than the outer shape of the magnet 2a, including a first hole 2b5 that is exposed by the magnet 2a.

The first rotating section 2b2 is provided below the retaining section 2b4. The first rotating section 2b2 has a hollow cylindrical shape, and a hole of the first rotating section 2b2 communicates with the first hole 2b5 of the retaining section 2b4. The first rotating section 2b2 rotatably supports the holder 2, as a part of the inner circumferential surface of the hollow cylindrically shaped hole 2b5 is a slide receiving surface that slides over the sliding surface of the outer circumference of the cylindrical shape of the first rotary support section 1b of the body section 1.

On the upper side of the flange section 2b, in addition to the arm attachment section 2b1, a second rotating section 2b3 is provided.

The second rotating section 2b3 has a hollow cylindrical shape, including a second hole 2b6 that is exposed by the magnet 2a. The second rotating section 2b3 is located above the first rotating section 2b2, sandwiching the magnet 2a therebetween, in the rotary axis direction of the magnet 2a. The center axis of the hollow cylindrically shaped first rotating section 2b2 and that of the second rotating section 2b3 are arranged coaxially. The rotary axis of the magnet 2a is also arranged coaxially with them. The second rotating section 2b3 has a circular cross-sectional shape vertical to the rotary axis direction of the magnet 2a, with the outer circumference being a sliding surface.

The holder 2 is placed in a manner such that by engaging the first rotating section 2b2 with the first rotary support section 1b of the body section 1, the magnet 2a of the holder 2 is placed opposite the magnetic detection surface 3a of the magnetic detection element 3, so that a magnetic pole change of the magnet 2a accompanying the rotating motions of the holder 2 can be detected by the magnetic detection element 3. By configuring the body section 1 and the holder 2 with the same resin material, sliding of the holder 2 is improved.

The magnetic detection element 3 is made of, for example, Hall IC, and electrically fixed to the terminals 1a by laser welding or resistance welding. To and from the magnetic detection element 3, power is supplied and a detected signal is transmitted through a lead wire 7 that is connected to the terminals 1a electrically.

The cover 4 is made of resin material such as POM. The cover 4 is fixed to the body section 1, preventing fall of the holder 2. The cover 4 includes a second rotary support section 4a, a base section 4b, a top plate section 4c, a first wall section 4d, and a second wall section 4e.

Figure 2:
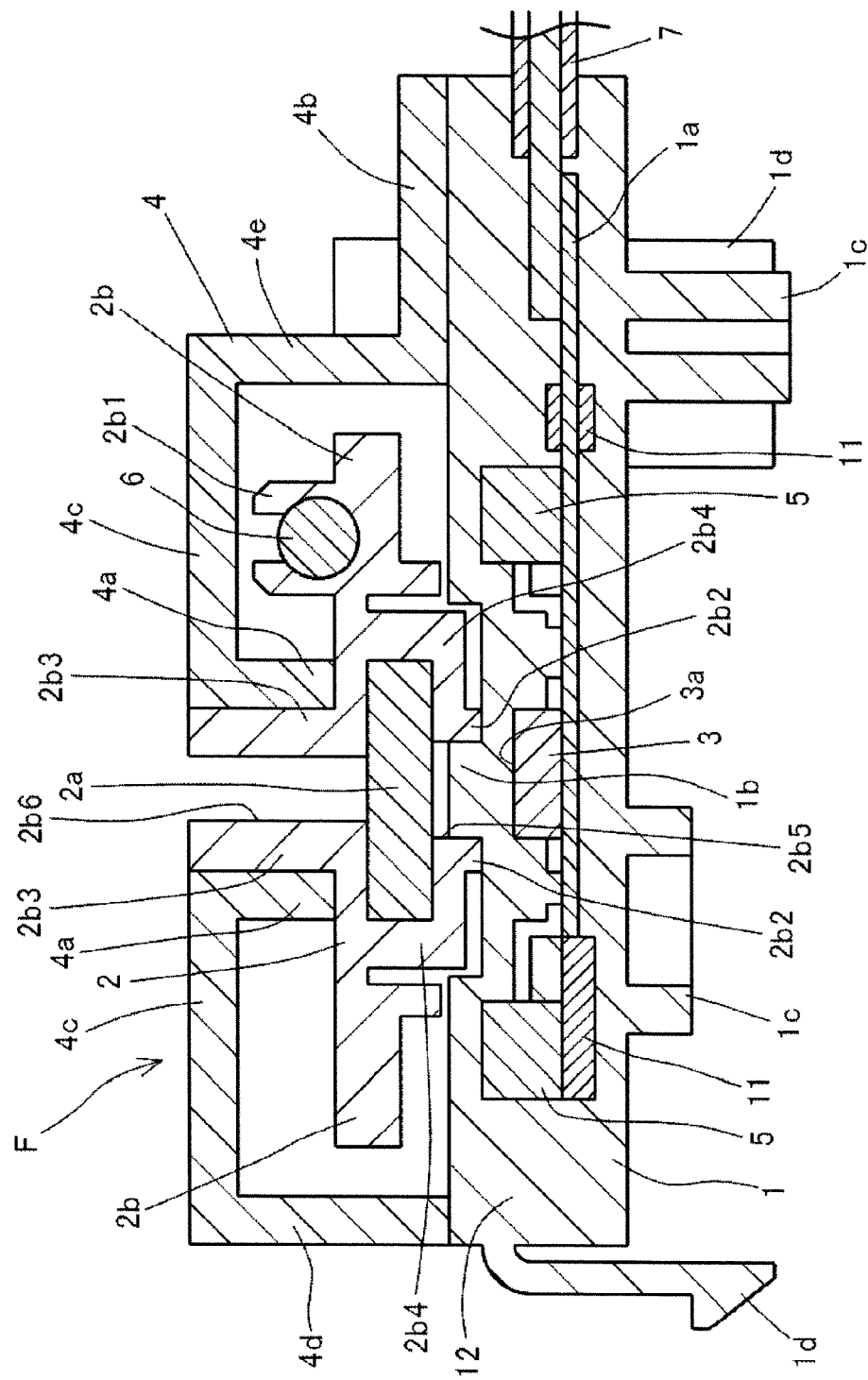
FIG. 2 is a sectional view taken along line A-A of FIG. 1.

As shown in FIG. 2, the cover 4 has a shape of a ladle turned upside down, which is defined by the base section 4b, the top plate section 4c, the first wall section 4d, and the second wall section 4e.

The second rotary support section 4a is provided on the top plate section 4c, protruding downward as shown in FIG. 2. The second rotary support section 4a has a hollow cylindrical shape, and its inner circumferential surface is a slide receiving surface that slides over the outer circumferential sliding surface of the second rotating section 2b3. The second rotary support section 4a rotatably supports the second rotating section 2b3.

The base section 4b has a flat-plate shape, and is fixed to the body section 1 for fixing the cover 4 to the body section 1. The base section 4b is fixed to the body section 1 by appropriate means such as laser welding.

The top plate section 4c has a flat-plate disk shape. As shown in FIG. 1, viewed from the top, the liquid surface detection device F has a cut-out portion at the top and at the bottom. At the middle of the top plate section 4c, the second rotary support section 4a is provided.

The first wall section 4d and the second wall section 4e are separated. When the liquid surface detection device F is viewed from above, the first wall section 4d and the second wall section 4e have a circular arc shape. From a portion where the first wall section 4d and the second wall section 4e are separated, the float arm 6 is exposed, and the first wall section 4d and the second wall section 4e function as a stopper to regulate the rotating range of the float arm 6. At the lower end of the first wall section 4d (portion in contact with the body section 1), fixed pieces 4d1 are provided. Like the base section 4b, the fixed pieces 4d1 are also fixed to the body section 1 by appropriate means such as laser welding.

As described above, by providing the body section 1 that provides on the holder 2 the first rotating section 2b2 and the second rotating section 2b3 sandwiching the magnet 2a therebetween in the rotary axis direction of the magnet 2a, the body section being provided with the first rotary support section 1b that places the magnetic detection element 3 opposite the magnet 2a in the rotary axis direction of the magnet 2a and that rotatably supports the first rotation section 2b2 of the holder 2, and the cover 4 that is fixed to the body section 1 and is provided with the second rotary support section 4a that rotatably supports the second rotating section 2b3 of the holder 2, the liquid surface detection device F providing for compactness and enabling a reduction in displacement of the rotary axis of a magnet can be provided.

Furthermore, the first rotary support section 1b provided on the body section 1 has a circular sliding surface as a cross-sectional shape vertical to the rotary axis direction of the magnet 2a, and the first rotating section 2b2 includes a slide receiving surface that rotatably supports the outer circumference of the sliding surface, so that displacement of the rotary axis of the magnet 2a can be reduced. Especially, by providing the first hole 2b5 that is exposed by the magnet 2a, the first rotating section 2b2 allows the first rotary support section 1b to be inserted into the first hole 2b5 and the first rotary support section 1b to comes close to the magnet 2a. In the limited space between the magnet 2a and the magnetic detection element 3, the magnetic detection element 3 is covered and protected by the second resin body 12, enabling rotatable support reducing displacement of the rotary axis of the magnet 2a.

Furthermore, the second rotating section 2b3 of the holder 2 has a sliding surface of which cross-section is formed in a circular shape and vertical to the rotary axis direction of the magnet 2a, and the second rotary support section 4a of the cover 4 includes a slide receiving surface that rotatably holds the outer circumference of the sliding surface, so that a wide distance can be set between the sliding surface of the second rotating section 2b3 and the slide receiving surface of the second rotary support section 4a in the rotary axis direction of the sliding portion, enabling rotatable support reducing displacement of the rotary axis of the magnet 2a.

Furthermore, by a simple configuration of the holder 2 and the cover 4 sequentially layered and arranged on the body section 1 that includes the magnetic detection element 3, the liquid surface detection device F can be obtained. Therefore, the production process can be simplified, resulting in production cost reduction.

Furthermore, the terminals 1a are mounted with the magnetic detection element 3 and the electronic part 5, so that a circuit board, which is required conventionally, is not necessary. Therefore, the configuration can be simplified, resulting in further production cost reduction.

The above-mentioned explanations are illustrative of the invention. Needless to say, various changes and modifications can be made without departing from the gist of the invention. In the embodiment, the first rotary support section 1b of the body section 1 may include a circular sliding surface as a cross-sectional shape vertical to the rotary axis direction of the magnet 2a, and the first rotating section 2b2 may include a slide receiving surface that rotatably supports the outer circumference of the sliding surface. Alternately, the second rotary support section 4a may include a circular sliding surface as a cross-sectional shape vertical to the rotary axis direction of the magnet 2a, and the second rotating section 2b3 may include a slide receiving surface that rotatably holds the outer circumference of the sliding surface.

INDUSTRIAL APPLICABILITY

The invention can be applied to a liquid surface detection device that detects a surface of liquid in a fuel tank.

REFERENCE SIGNS LIST

F liquid surface detection device
1 body section
1b first rotary support section
2 holder
2a magnet
2b2 first rotating section
2b3 second rotating section
3 magnetic detection element
4 cover
4a second rotary support section

The invention claimed is:

1. A liquid surface detection device comprising:
    a holder rotating in response to displacement of a float arm, the displacement accompanying a change in a liquid surface, the holder is provided with a first rotating section and a second rotating section;
    a magnet having a solid cylindrical shape affixed to the holder and rotating along with the holder, the magnet being sandwiched by the first rotating section and the second rotating section in a rotary axis direction of the magnet;
    a magnetic detection element detecting a magnetic force change accompanying the rotating motion of the magnet;
    a body section being provided with a first rotary support section that rotatably supports the first rotating section of the holder; and
    a cover being fixed to the body section and being provided with a second rotary support section that rotatably supports the second rotating section of the holder,
    wherein the magnetic detection element disposed on an axis of rotation of the magnet in the following order: the magnet, the first rotary support section, and the magnetic detection element.

2. The liquid surface detection device according to claim 1, wherein the first rotary support section has a slidable surface of which cross-section is formed in a circular shape and vertical to the rotary axis direction of the magnet, and the first rotating section includes a slide receiving surface that rotatably supports an outer circumference of the slidable surface.

3. The liquid surface detection device according to claim 1, wherein the second rotating section has a slidable surface of which cross-section is formed in a circular shape and vertical to the rotary axis direction of the magnet, and the second rotary support section includes a slide receiving surface that rotatably holds an outer circumference of the slidable surface.

4. The liquid surface detection device according to claim 1, wherein the magnetic detection element comprises a magnetic detection surface that detects the magnetic force change.

5. The liquid surface detection device according to claim 4, wherein the magnetic detection surface of the magnetic detection element is perpendicular to the axis of rotation of the magnet.

6. The liquid surface detection device according to claim 5, wherein the magnet including a first surface, a second surface opposite the first surface, and a lateral surface extending between the first surface and the second surface.

7. The liquid surface detection device according to claim 6, wherein the first surface of the magnet and the magnetic detection surface of the magnetic detection element face each other.

* * * * *